United States Patent [19]
Kawai et al.

[11] Patent Number: 5,444,833
[45] Date of Patent: Aug. 22, 1995

[54] GRAPHIC EDITING APPARATUS WITH GRID SIZE SELECTION

[75] Inventors: Tomoaki Kawai, Yokohama; Takashi Nakamura, Hiratsuka; Tsuneaki Kadosawa, Kanagawa; Kunitaka Ozawa, Isahara; Eiji Koga, Hadano; Satoshi Ogiwara, Sagamihara, all of Japan

[73] Assignee: Canon Kabushiki Kaisha, Tokyo, Japan

[21] Appl. No.: 22,620

[22] Filed: Feb. 17, 1993

Related U.S. Application Data

[63] Continuation of Ser. No. 480,574, Feb. 15, 1990, abandoned.

[30] Foreign Application Priority Data

Feb. 15, 1989 [JP] Japan ................................. 1-33796

[51] Int. Cl.⁶ .......................................... G06T 11/80
[52] U.S. Cl. ................................. 395/133; 395/139; 395/148

[58] Field of Search ............... 395/133, 118, 123, 125, 395/126, 127, 128, 129, 130, 132, 135, 136, 139, 140, 141, 145, 147, 148, 155, 161; 382/47

[56] References Cited

U.S. PATENT DOCUMENTS

| | | | |
|---|---|---|---|
| 4,343,037 | 8/1982 | Bolton | 395/130 |
| 4,645,459 | 2/1987 | Graf et al. | 395/126 X |
| 4,790,028 | 12/1988 | Ramage | 382/47 |
| 4,931,784 | 6/1990 | Easterbrook | 395/118 |
| 4,982,345 | 1/1991 | Callahan et al. | 364/518 X |
| 5,216,755 | 6/1993 | Walker et al. | 395/132 |
| 5,276,787 | 1/1994 | Searby | 395/132 |
| 5,289,566 | 2/1994 | Walker et al. | 395/132 |

Primary Examiner—Almis R. Jankus
Attorney, Agent, or Firm—Fitzpatrick, Cella, Harper & Scinto

[57] ABSTRACT

In a graphic editor, a graphic pattern is entered by a pointer with the aid of grid points. The size of the grid points is varied over the entire display image or over a portion of the display image according to the type of entering operation.

16 Claims, 5 Drawing Sheets

| KINDS OF OPERATION | PROCESS CONTENTS |
|---|---|
| PUT ×××<br>MOVE ×××<br>DEL ×××<br>⋮<br>SAVE<br>EXIT | TO ADD ×××<br>TO MOVE ×××<br>TO DELETE ×××<br>⋮<br>TO STORE EDITING DATA<br>END |

FIG. 2B

| ××× | ATTRIBUTE | CONTENTS |
|---|---|---|
| IF | SYMBOL | OPERATION FOR  |
| CALL | SYMBOL | OPERATION FOR  |
| EXPR | SYMBOL | OPERATION FOR  |
| BEGIN | SYMBOL | OPERATION FOR  |
| END | SYMBOL | OPERATION FOR  |
| LINE | LINE CONNECTION | OPERATION FOR LINE CONNECTION |
| TEXT | TEXT | OPERATION FOR TEXT |

GRAPHIC EDITING APPARATUS WITH GRID SIZE SELECTION

This application is a continuation of application Ser. No. 07/480,574, filed Feb. 15, 1990 now abandoned.

BACKGROUND OF THE INVENTION

1. Field of the Invention

The present invention relates to a graphic editing apparatus, and more particularly to a graphic editing apparatus utilizing a pointing device.

2. Related Background Art

In such a field, there is already known, for example, CAD (computer aided design) apparatus. In the editing of symbols of graphic patterns with a pointing device in such apparatus, the obtained pattern may become distorted if any coordinate position can be freely designated. In order to avoid such drawback, there is already known a method of allowing the designation only in scattered points called grid points, wherein any designated point other than the grid points is replaced by a closest grid point. In such a method, because the optimum size (scale or distance) of the grid points varies depending on the object or kind of operation, the size is made variable by an input command.

SUMMARY OF THE INVENTION

In consideration of the foregoing, an object of the present invention is to provide a graphic editing apparatus with improved operability by varying the size of grid according to the kind or object of operation, comprising input means for entering graphic operating information indicating the content of operation, and switching means for switching the grid size according to the operating information.

Another object of the present invention is to provide a graphic editing apparatus capable of varying the distance of the grid points according to a command.

Still another object of the present invention is to provide a graphic editing apparatus capable of varying the scale of the grid according to the graphic pattern to be processed.

Still another object of the present invention is to provide a graphic editing apparatus for editing a graphic pattern on an image display frame with a grid size variable according to the graphic operating information indicating the content of operation, comprising input means for entering graphic operating information indicating the content of operation, and switching means for switching the grid size according to the operating information.

Still another object of the present invention is to provide a graphic editing apparatus for editing a graphic pattern on an image display frame with a grid size variable according to the graphic pattern indicating the content of operation, comprising input means for entering graphic information indicating the content of operation, and switching means for switching the grid size according to the entered graphic information.

Still another object of the present invention is to provide a graphic editing apparatus for editing a graphic pattern on an image display frame with a grid size variable according to the graphic pattern indicating the content of operation, comprising memory means for storing a grid size for each corresponding graphic pattern information, input means for entering graphic pattern information, selection means for selecting a grid size from the memory means according to the entered graphic pattern information, and switching means for switching the grid size to the one selected by the selection means.

Still another object of the present invention is to provide a graphic editing apparatus for editing a graphic pattern on an image display frame with a grid size variable according to the graphic pattern operating information indicating the content of operation, comprising memory means for storing a grid size for each corresponding operating information, input means for entering operating information, selection means for selecting a grid size from the memory means according to the entered operating information, and switching means for switching the grid size to the one selected by the selection means.

Still other objects of the present invention will become fully apparent from the following description of the embodiments.

DETAILED DESCRIPTION OF THE PREFERRED EMBODIMENTS

Now the present invention will be clarified in detail by preferred embodiments thereof shown in the attached drawings.

At first there will be explained the kinds of operations corresponding to editing data in the present embodiment.

Figure 2A:
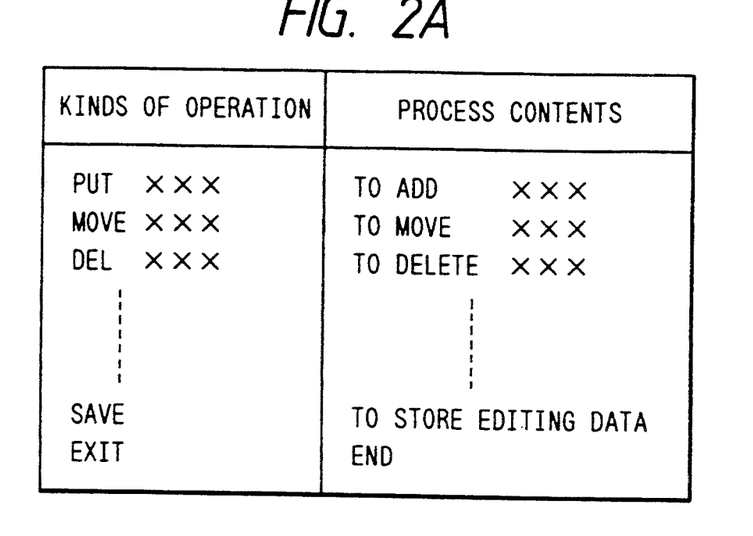
FIG. 2A is a table showing the contents of processing corresponding to various operations in the embodiment.
Figure 2B:
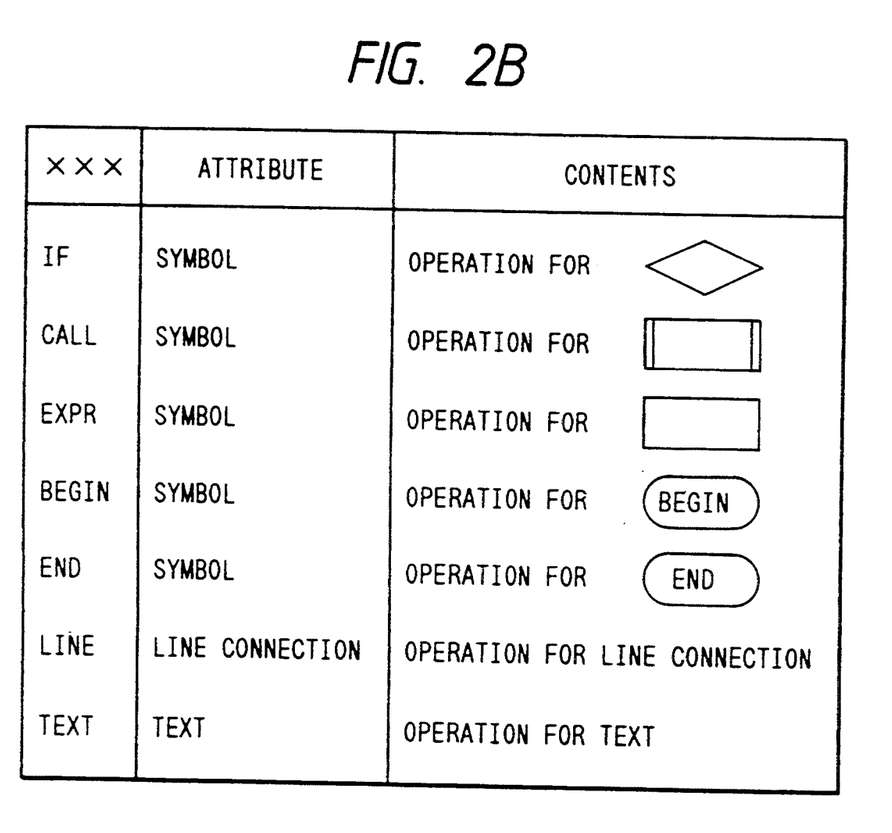
FIG. 2B is a table showing attributes corresponding to various operations in the embodiment.

FIG. 2A shows the contents of processing corresponding to the operations in the present embodiment, and FIG. 2B shows the kind of attributes to be subjected to various operations in the present embodiment. In the example shown in FIGS. 2A and 2B, the attributes constituting the graphic components include "if", "call", "expr.", "begin", "end", "line" and "text" which can be, for example, added, moved or deleted by various operations such as "put", "move" or delete. An operation "save" stores the edited data in a floppy disk driver FDD 8 or a hard disk driver HDD 9, and an operation "exit" terminates the graphic editing process.

Now there will be explained the structure and function of the present embodiment.

Figure 1:
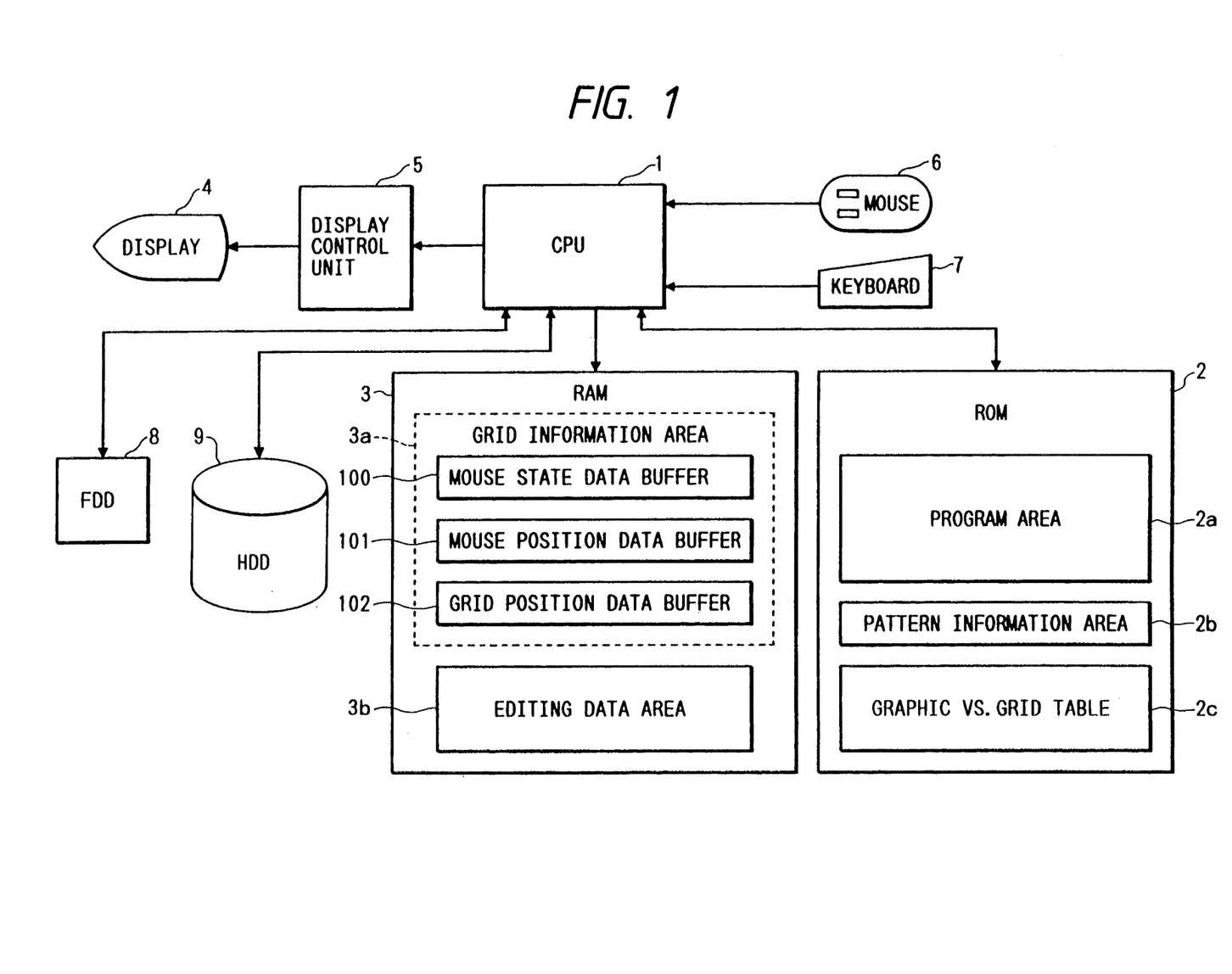
FIG. 1 is a block diagram of an embodiment of the graphic editing apparatus of the present invention.
Figure 3:
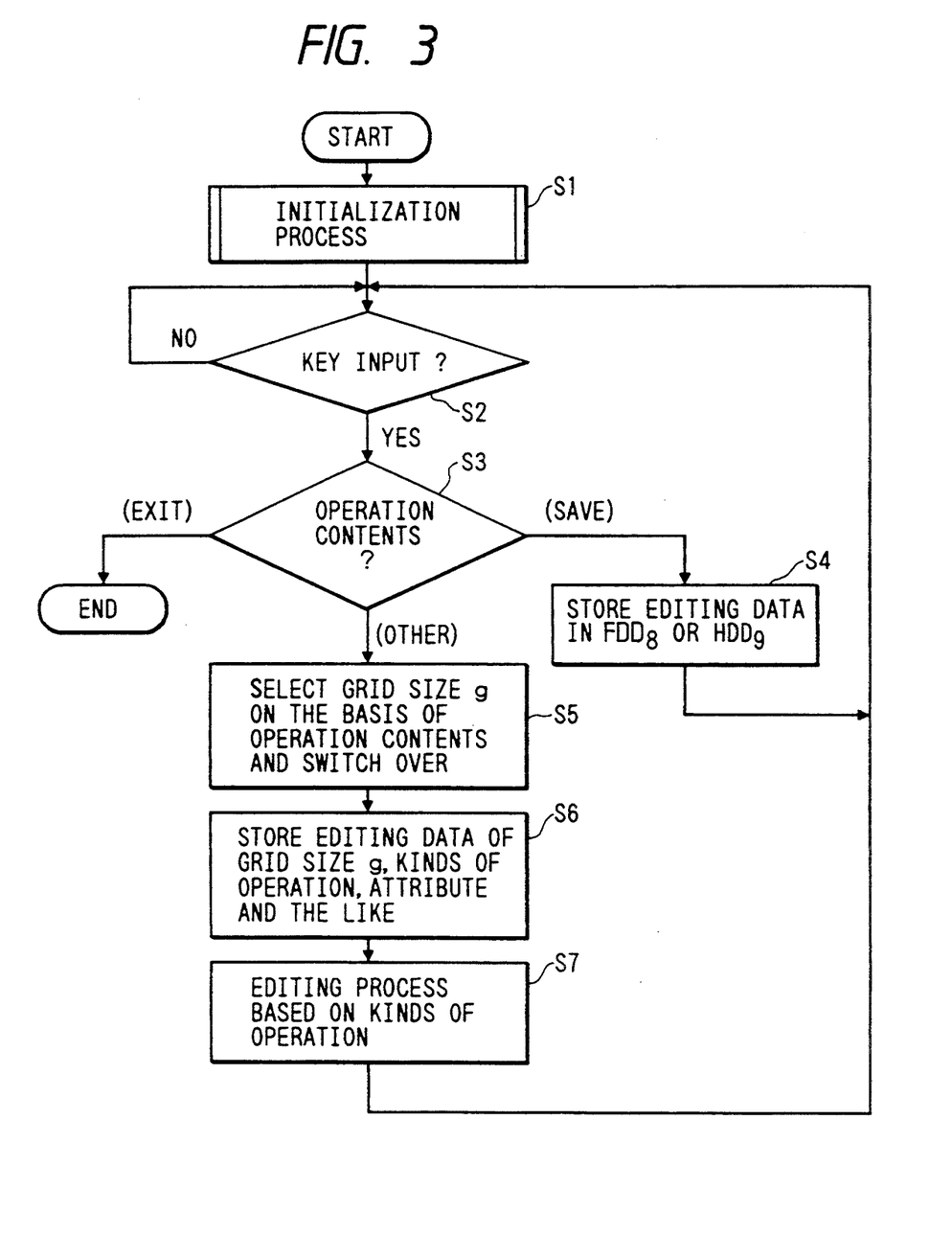
FIG. 3 and 4 are flow charts of the graphic processing sequence of a central processing unit 1.
Figure 4:
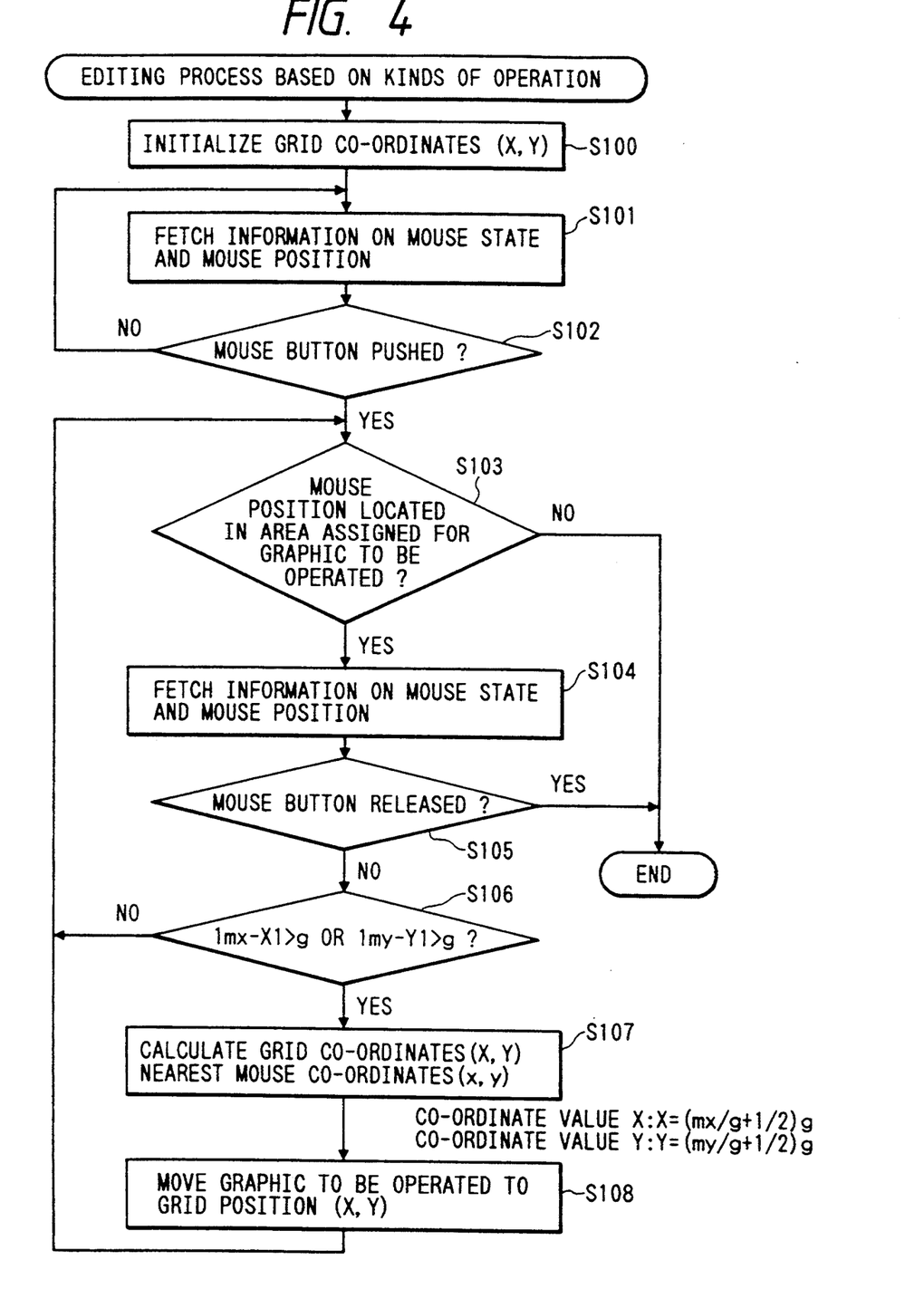

FIG. 1 is a block diagram of the graphic editing apparatus of the present embodiment, wherein provided are a central processing unit (CPU) 1 for controlling the function of the entire apparatus according to various programs stored in a ROM 2; a ROM 2 storing control programs, error processing programs, and a program for operating the CPU 1 according flow charts shown in FIGS. 3 and 4; a RAM 3 serving as a work area for various programs and a temporary diversion area in the error processing; a display unit 4 for displaying the state of editing in the course of graphing editing; a display control unit 5 for controlling the display on the display unit 4 in response to commands from a mouse 6 and a keyboard 7; a mouse 6 for designating the graphic pattern to be operated and designating the destination of movement of the designated graphic pattern; and a keyboard 7 for designating the operation, shown in FIGS. 2A and 2B, to be applied to the graphic pattern to be operated. The ROM 2 is provided with a program area 2a, a pattern information area 2b storing graphic pattern information, and a graphic-grid table 2c storing grid sizes corresponding to the graphic patterns shown in FIG. 2B. The RAM 3 is provided with a grid information 3a, and an editing data area 3b for storing editing data read from a floppy disk driver FDD 18 or a hard disk driver HDD 9 or the data in the course of processing. The grid information area 3a is provided with a mouse state data buffer 100 for storing the state changes of the mouse 6, namely whether the buttons of the mouse 6 are pushed or released, in the form of codes, a mouse position data buffer 101 for storing the coordinate (mx, my) of the position designated by the mouse 6, and a grid position data buffer 102 for storing the coordinate (X, Y) of a grid point closest to the position designated by the mouse 6.

The graphic editing process of the present embodiment is conducted in the following manner.

FIGS. 3 and 4 are flow charts showing the graphic editing process of the CPU 1.

When the editing program for graphic editing is activated, there is at first conducted the initialization such as initial image display setting, including the setting of an initial size of the grid g (step S1). When a key input is made from the keyboard 7 (step S2), there is identified the operation in FIG. 2A, indicated by the key input (step S3). If the step S3 identifies an operation SAVE, the data in the editing data area 3b are stored in the FDD 8 or HDD 9 (step S4). After the operation SAVE, the step S2 awaits the key input again, and, if the step S3 identifies an operation EXIT, the entire process is terminated.

On the other hand, if the step S3 identifies the key input as an operation other than SAVE or EXIT, the grid size is selected and switched according to the result of this discrimination (step S5). The step S5 selects an appropriate grid size from the graphic-grid table 2c according to the kind of operation and the attribute (graphic pattern to be operated) to be processed by the operation, and the grid shown on the display unit 4 is switched to thus determined grid size for the following operations. For example, in case of an operation "MOVE XXX" for moving a pattern, the step S5 selects a fine grid size g stored in the table 2c, as a finer grid size facilitates the mouse operation. Also in case of an operation "DELETE XXX" the step S5 selects a coarse grid size g stored in the table 2c because the operation is easier with a coarse grid size, though the operation itself is not affected, by its nature and by the grid size. Then all the editing data including the grid size, kind of operation and attribute, are stored in the editing data area 3b (step S6).

After the setting of an appropriate grid size in the above-explained manner, there is started the graphic editing operation (step S7) according to the kind of operation identified in the step S3.

As an example, there will be explained the sequence in case an operation "MOVE XXX" is instructed by the user, with reference to FIG. 4. The operations "PUT", "DEL." etc. will be omitted from the following description.

The sequence for the operation "MOVE" is started according to the discrimination in the step S3, and the coordinate values X, Y for retaining the grid points are initialized (step S100). Until the button of the mouse is shifted from the released state to the pushed state, the mouse state data buffer 100 stores a code representing the released or pushed state, and the coordinate values mx, my are stored in the mouse position data buffer 101. Also the grid position data buffer 102 stores initial values "0" of the variables X, Y (steps S101, S102).

When the mouse button is pushed, there is discriminated whether a pattern to be moved can be designated at the current mouse position. In this case there is discriminated whether the coordinate values mx, my are positioned within an effective area for example of rectangular shape in which the designation of a pattern to be operated is permitted, namely whether the data exist in the area assigned for patterns (step S103). If the coordinates mx, my indicate a position outside the area, the sequence returns to the step S2 to await the instruction from the user.

On the other hand, if the step S103 confirms that the coordinates mx, my are in the assigned area, the information on the state and position of the mouse are fetched as in the step S101 (step S104). If the button of the mouse is maintained in the pushed state, there is conducted a process of changing the variables mx, my, indicating the mouse position, to the variables X, Y indicating a grid position close to the mouse position. At first there is calculated the distance between the currently set grid position and the mouse position, and there is discriminated whether the distance exceeds the grid size g in the x- or y-axis direction. Thus there are conducted comparisons between the distance $|mx-X|$ and the grid size g in the x-axis direction and between the distance $|my-Y|$ and the grid size in the y-axis direction (step S106).

If the step S106 identifies that the distance exceeds the grid size g in the x- or y-axis direction, a step S107 calculates a grid position close to the mouse position. In this case, the coordinates X, Y of the grid position can be calculated as follows:

$X = (mx/g + \frac{1}{2}) \times g$ $Y = (my/g + \frac{1}{2}) \times g$

After the grid position is determined by these equations, the pattern to be operated is moved in parallel manner from the position mx, my designated by the mouse 6 to the grid position (X, Y) (step S108). After the movement, the sequence returns to the step S103. Then, while the button of the mouse remains in the pushed state, there is detected the distance, or the amount of movement, between the previous grid position and the current mouse position, and the pattern to be operated is moved to the grid position if the distance exceeds the grid size g.

In the following there will be explained an example of graphic editing including for example the addition of a pattern, in addition of the pattern movement.

Figure 5:
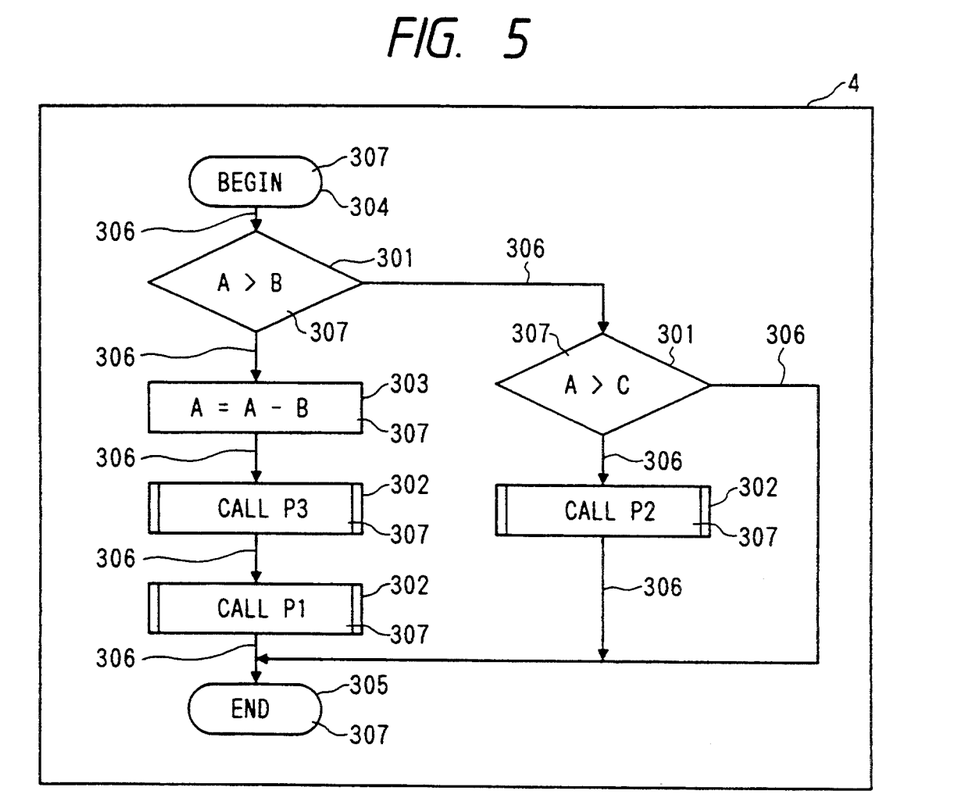
FIG. 5 is a flow chart showing an example of sequence for preparing a flow chart on a display 4.

FIG. 5 shows an example of preparing a flow chart on the display unit 4, including a symbol "if" 301, a symbol "call" 302, a symbol "expr." 303, a symbol "begin" 304, a symbol "end" 305, a line connection "line" 306, and a "text" 307.

The grid size g is selected finer in the operation "MOVE" than for example in the operation "PUT", or "DEL." and is effective for example in connecting the line 306 to the symbol 301. Also the grid size g is selected larger in the operation "PUT" or "DEL." than in the operation "MOVE" in order to enable faster designation of the pattern to be processed, thus being effective in the processing of unnecessary patterns.

As explained in the foregoing, the present embodiment improves the operability in the graphic editing, since the grid size is automatically changed for example according to the kind or object of operation.

The foregoing embodiment may also be so constructed as to allow registration of new patterns, and, in such case, a grid size is also stored corresponding to the registered pattern.

In the foregoing embodiment, the pattern to be operated is continuously moved to the grid position in response to the change in the mouse position as long as the button of the mouse remains in the pushed state, but the present invention is not limited to such embodiment. For example it is possible not to move the pattern during the continuous movement of the mouse, but to draw the pattern at the grid position when the button of the mouse is released. This can be achieved by a simple modification in the algorithm.

Also for improving the operability there may be displayed dots representing the grids on the display unit. In such case the grid size is automatically switched according to the kind of operation.

Also in the foregoing embodiment the grid size is uniformly changed over the entire display frame according to the kind and object of operation, but the present invention is not limited to such embodiment. As a variation, when patterns, lines and texts are displayed on the image display frame, the grid size may be varied in the vicinity of the image according to the kind thereof, so that the grid size becomes not uniform in the same image display frame. This can be achieved, when a pattern, a line or a text is added on the image display frame, by varying the grid size in a certain predetermined rectangular area around the added image. Also in such case the grid may be displayed by the dots thereof, and the operability can be improved because uneven grids are made visible on the image display frame. Such variation can also provide the effect and advantage as in the foregoing embodiment. Furthermore, the aboveexplained partial switching of grid size and the overall switching of the grid size in the entire display frame explained in the foregoing embodiment may be made selectable by the user.

Furthermore, in the foregoing embodiment, the grid size is determined from the graphic-grid table in the ROM according to the graphic pattern to be operated, but the present invention is not limited to such a embodiment. For example, it is also possible to determine the grid size without such a table, by providing each graphic pattern with physical attributes such as input pins or wirings. In such case the form of each graphic pattern is fixed.

In the foregoing embodiment, the grid size is uniquely determined by the graphic-grid table 2c, but there may be provided a grid table according to the kind of operation as shown in FIG. 2A and a grid table according to the object of operation as shown in FIG. 2B, or either one of the grid tables.

We claim:

1. A graphic editing apparatus for editing a graphic pattern on an image display frame, the image display frame having a grid size variable according to operating information indicating a content of an operation, comprising:

input means for entering a plurality of operating information units for the graphic pattern, indicating the content of the operation;

executing means responsive to the entry of each of said plurality of operating information units for executing a process corresponding to each of said plurality of operating information units: and switching means for switching the grid size according to each of said plurality of operating information units.

2. An apparatus according to claim 1, wherein said switching means comprises means for switching the grid size uniformly over the image display frame.

3. An apparatus according to claim 1, wherein said switching means comprises means for switching the grid size in an area of the graphic pattern to be operated.

4. An apparatus according to claim 1, wherein said switching means comprises first switching means for switching the grid size uniformly over the image display frame, second switching means for switching the grid size in an area of the graphic pattern to be operated, and third switching means for selecting said first switching means or said second switching means.

5. A graphic editing apparatus for editing a graphic pattern on an image display frame, the image display frame having a grid size variable according to operating information indicating a content of an operation, comprising:

memory means for storing a plurality of Grid sizes, each of the plurality of Grid sizes corresponding to one of a plurality of operating information units;

input means for entering the plurality of operating information units;

executing means responsive to the entry of each of said plurality of operating information units for executing a process corresponding to each of the plurality of operating information units;

selection means for selecting a grid size from said memory means according to said plurality of operating information units; and switching means for switching to the grid size selected by said selection means.

6. An apparatus according to claim 5, wherein said switching means comprises means for switching the grid size uniformly over the image display frame.

7. An apparatus according to claim 5, wherein said switching means comprises means for switching the grid size in an area of the graphic pattern to be operated.

8. An apparatus according to claim 5, wherein said switching means comprises first switching means for switching the grid size uniformly over the image display frame, second switching means for switching the grid size in an area of the graphic pattern to be operated, and third switching means for selecting said first switching means or said second switching means.

9. A graphic editing apparatus for editing a graphic pattern on an image display frame, the image display frame having a grid size variable according to operating information indicating a content of an operation, comprising:

input means for entering a plurality of graphic information units indicating the content of operations;

executing means responsive to the entry of each of said plurality of graphic information units, for executing a process corresponding to each of said plurality of graphic information units; and switching means for switching the grid size according to each of the plurality of graphic information units entered by said input means.

10. An apparatus according to claim 9, wherein said switching means comprises means for switching the grid size uniformly over the image display frame.

11. An apparatus according to claim 9, wherein said switching means comprises means for switching the grid size in an area of the graphic pattern to be operated.

12. An apparatus according to claim 9, wherein said switching means comprises first switching means for switching the grid size uniformly over the image display frame, second switching means for switching the grid size in an area of the graphic pattern to be operated, and third switching means for selecting said first switching means or said second switching means.

13. A graphic editing apparatus for editing a graphic pattern on an image display frame, the image display frame having a grid size variable according to a operating information indicating a content of an operation, comprising:

memory means for storing a plurality of grid sizes, each of the plurality of grid sizes corresponding to one of a plurality of graphic information units;

input means for entering one of the graphic information units;

executing means responsive to the entry of each of the plurality of graphic information units, for executing a process corresponding to each of said plurality of graphic information units;

selection means for selecting a grid size from said memory means according to said entered graphic information unit; and switching means for switching to the grid size selected by said selection means.

14. An apparatus according to claim 13, wherein said switching means comprises means for switching the grid size uniformly over the image display frame.

15. An apparatus according to claim 13, wherein said switching means comprises means for switching the grid size of the image display frame in an area of the graphic pattern to be operated.

16. An apparatus according to claim 13, wherein said switching means comprises first switching means for switching the grid size uniformly over the image display frame, second switching means for switching the grid size in an area of the graphic pattern to be operated, and third switching means for selecting said first switching means or said second switching means.

* * * * *

UNITED STATES PATENT AND TRADEMARK OFFICE
CERTIFICATE OF CORRECTION

PATENT NO. : 5,444,833
DATED : August 22, 1995
INVENTOR(S) : TOMOAKI KAWAI, ET AL.

Page 1 of 2

It is certified that error appears in the above-identified patent and that said Letters Patent is hereby corrected as shown below:

COLUMN 2

Line 61, "according" should read --according to--.

COLUMN 3

Line 11, "FDD 18" should read --FDD 8--.

COLUMN 4

Line 24, "pushed state" should read --pushed state (step 10I)--.

COLUMN 5

Line 43, "aboveex-" should read --above-ex- --.
    Line 51, "a" should read --an--.

COLUMN 6

Line 5, "units" should read --units,--.
    Line 30, "Grid" should read --grid--.
    Line 31, "Grid" should read --grid--.
    Line 36, "units" should read --units,--.

UNITED STATES PATENT AND TRADEMARK OFFICE
CERTIFICATE OF CORRECTION

PATENT NO. : 5,444,833
DATED : August 22, 1995
INVENTOR(S) : TOMOAKI KAWAI, ET AL.

It is certified that error appears in the above-identified patent and that said Letters Patent is hereby corrected as shown below:

COLUMN 7

Line 20, "a" (second occurrence) should be deleted.

Signed and Sealed this

Ninth Day of April, 1996

BRUCE LEHMAN

Attest:

Attesting Officer

Commissioner of Patents and Trademarks